2,891,920

POLYMERIZATION OF ORGANOPOLYSILOXANES IN AQUEOUS EMULSION

James F. Hyde and Jack R. Wehrly, Midland, Mich., assignors to Dow Corning Corporation, Midland, Mich., a corporation of Michigan No Drawing. Application January 26, 1955
Serial No. 484,320

5 Claims. (Cl. 260—29.2)

This invention relates to the emulsion polymerization of organosiloxanes.

One of the problems which has not heretofore been solved in the organosilicon field is a good method of preparing stable emulsions of extremely high molecular weight siloxanes, i.e., siloxanes which would be of sufficiently high molecular weight to make suitable protective coatings. This has been accomplished heretofore after a fashion by first dissolving the siloxane in a solvent and then emulsifying the solution. However, this method has disadvantages inherent to the use of solvents. Furthermore, such emulsions are not particularly stable. Emulsified coating compositions are widely employed in the organic resin art and the great advantages of such compositions is well-illustrated in the rapidly growing use of latices in the production of water base paints. To date, however, no suitable organosiloxane latices has been available. This invention makes possible the preparation of such materials on a commercial scale.

It is the primary object of this invention to provide a novel method for polymerizing organopolysiloxanes. Another object is to provide superior organopolysiloxane emulsions. Another object is to provide emulsified polysiloxanes of sufficiently high molecular weight to serve as protective coatings. Another object is to provide a method of more rapidly polymerizing organosiloxanes with acid catalyst. Another object is to provide a more rapid method for the preparation of hydroxyl end-blocked diorganosiloxane fluids of controlled molecular size. Other objects and advantages will be apparent from the following description.

In accordance with this invention the polymerization of an organopolysiloxane is carried out while the siloxane is dispersed in an aqueous media. The polymerization is effected by contacting the dispersed siloxane with a catalyst of the group strong mineral acids and strong alkalis.

In carrying out the method of this invention the siloxane may be first dispersed in the water preferably with the use of an emulsifying agent and the catalyst then added and the emulsion allowed to stand with or without agitation at the desired temperature until the siloxane has reached the desired state of molecular aggregation. Alternatively, the catalyst may be added to the siloxane prior to dispersion or simultaneously with dispersion. In the preferred procedure an emulsifying agent is dispersed in the siloxane and the mixture is then added with agitation to water to give the desired emulsion. The catalyst is then added and polymerization is allowed to proceed.

Polymerization of the siloxanes proceeds satisfactorily at room temperature but may be carried out at any desired temperature. Preferably, of course, this should be below the boiling point of water although if desired, temperatures above 100° C. can be employed if the polymerization is carried out in a closed system. The preferred temperature range is from 25 to 80° C.

The time of polymerization is not critical but will vary depending upon the speed of the reaction and the viscosity desired in the resulting siloxane. The time may also be regulated by the particle size desired in the finished emulsion. It has been found that as the polymerization proceeds the viscosity of the siloxane will increase and the size of the emulsion droplets decreases. A combination of these two processes is believed to result in the extremely stable emulsions obtained by the method of this invention.

The concentration of the siloxane with respect to the water is not critical. All that is required is that dispersion be a siloxane in water emulsion. Thus so long as there is enough water to give a continuous aqueous phase the polymerization will proceed in accordance with this invention. Polymerizations can be carried out at siloxane concentrations of 1% by weight or less.

When polymerization is complete the siloxane may be recovered from the emulsion by breaking it in any desired fashion such as by the addition of salts such as sodium chloride or by evaporation of the water.

Any organosiloxane of the formula $$R_n SiO_{\frac{4-n}{2}}$$

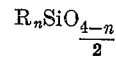

in which R is of the group monovalent hydrocarbon radicals, halogenated monovalent hydrocarbon radicals or hydrogen atoms and in which $n$ has an average value from 1 to less than 3 can be employed in the method of this invention. Thus it can be seen that the siloxanes employable range from resinous materials having an average of 1 R group per silicon up to fluid end-blocked polymers having an average of greater than 2 R groups per silicon. The viscosity of the starting siloxane is not critical. If the viscosity is too high for adequate dispersion of the siloxane, a small amount of solvent may be employed which may subsequently be removed if desired, before polymerization is begun. It should be understood that the method of this invention applies equally well to the preparation of homopolymeric siloxanes and to the preparation of copolymeric siloxanes. Thus for example one might polymerize an organosiloxane of the formula $R_2SiO$ such as dimethylsiloxane or one may copolymerize mixtures of siloxanes of the formulae $RSiO_{1.5}$, $R_2SiO$ and $R_3SiO_{.5}$.

For the purpose of this invention the organopolysiloxanes can be substituted with any monovalent hydrocarbon radical such as alkyl radicals such as methyl, ethyl, and octadecyl; alkenyl radicals such as vinyl, allyl and hexenyl; cycloaliphatic radicals such as cyclohexyl and cyclohexenyl; aryl hydrocarbon radicals such as phenyl, tolyl and xenyl; and alkaryl hydrocarbon radicals such as benzyl; halogenated monovalent hydrocarbon radicals such as chlorophenyl, $\alpha,\alpha,\alpha$-trifluorotolyl, trifluorovinyl, trifluorochlorocyclobutyl and tetrabromoxenyl. The R groups on the siloxane can also be hydrogen although preferably there should not be more than 1 hydrogen atom per silicon.

The catalysts which are operative in the process of this invention are strong mineral acids such as hydrochloric, hydrobromic and hydroiodic, sulfuric, nitric, and phosphoric and strong alkaline catalysts such as alkali metal hydroxides such as sodium hydroxide, caesium hydroxide and lithium hydroxide and quaternary ammonium hydroxides of the formula $R_4NOH$. In the latter the R groups can be any saturated alkyl hydrocarbon radicals such as methyl, ethyl, octadecyl, or any aralkyl radical such as benzyl and phenylethyl, or any hydroxy alkyl radicals such as hydroxyethyl, hydroxypropyl or hydroxybutyl. These acid and alkaline catalysts are characterized by their ability to rearrange siloxane bonds.

The catalyst may be employed in any desired amount and the particular amount will vary depending upon the nature of the catalyst. For example, alkaline catalysts are preferably employed in relatively low concentrations such as from 1 alkali molecule per 100 silicon atoms to 1 alkali molecule per 50,000 silicon atoms. On the other hand, acid catalysts are generally employed in higher concentrations, i.e., the acid concentration in the aqueous phase of the emulsion may range from 15 to 80% by weight.

The preferred acid catalyst is hydrochloric acid. The preferred alkaline catalysts are quaternary ammonium hydroxides having at least 1 alkyl radical of at least 12 carbon atoms attached to the nitrogen. These hydroxides are preferred because they perform both as emulsifying agents and as polymerization catalyst for the siloxane. Their superior performance over other alkaline catalysts is presumably due to a higher degree of solubility in the dispersed siloxane than is obtained with other alkaline materials such as the alkali metal hydroxide or quaternary ammonium hydroxides having lower alkyl or aralkyl radicals attached to the nitrogen. The preferred quaternary ammonium hydroxides may be employed either as the hydroxide, per se, or in the form of a salt such as for example the quaternary ammonium chlorides, nitrates, sulfates, acetates, etc. In case the salts are employed, excellent emulsions are formed but polymerization is not obtained unless an acid catalyst is added or the emulsion is rendered alkaline by the addition of some alkaline material such as ammonia, sodium carbonate, or organic amines. When the emulsion is rendered alkaline some of the quaternary ammonium hydroxide is generated "in situ" and catalyzes the polymerization of the siloxane.

Specific examples of the preferred alkaline catalysts are octadecyltrimethyl ammonium hydroxide, diodecylidiethyl ammonium hydroxide, tetradodecyl ammonium hydroxide, tritetradecylmethyl ammonium hydroxide and hexadecyloctadecyldimethyl ammonium hydroxide.

As stated above the dispersion of the siloxane may be carried out in any desired manner. This is best accomplished by the use of a dispersing agent which can be of the cationic, anionic or nonionic type. The specific type of emulsifying agent chosen will depend somewhat on the catalyst employed. For example, it is preferable not to employ an acid catalyst in conjunction with anionic emulsifying agents. In general, it has been found that the cationic type of dispersing agent is the best for alkaline polymerization. The nonionic type of emulsifying agent being about equally suitable with either alkaline or acid catalysts.

The dispersing agent can be any cationic emulsifying agent such as aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethylamine; derivatives of ethylene diamine; quaternary ammonium compounds such as dioctadecyldimethyl ammonium chloride, didodecyldimethyl ammonium chloride and dihexadecyldimethyl ammonium chloride; amide derivatives of amino alcohols such as β-hydroxyethylstearylamide; amine salts of long chain fatty acids; quaternary ammonium bases derived from fatty amides of di-substituted diamines such as oleylbenzylaminoethylene diethylamine hydrochloride; quaternary ammonium bases of the benzimidazolines such as methylheptadecyl benzimidazol hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as the condensation products of stearic acid and diethylene triamine; polyethylene diamines; and polypropanolpolyethanol amines.

Suitable nonionic emulsifying agents are the saponines; condensation products of fatty acids with ethylene oxide such as dodecyl ether of tetraethylene oxide; condensation products of ethylene oxide and sorbitan monolaurate; condensation products of ethylene oxide and sorbitan trioleate and condensation products of phenolic compounds having side chains with ethylene oxide such as condensation products of ethylene oxide with isododecylphenol; and imine derivatives such as polymerized ethylene imine and N-octadecyl-N,N'-ethylene imide.

Suitable anionic emulsifying agents are alkali metal sulforicinates; sulfonated glyceryl esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acid nitriles such as palmitonitrile sulfonate; sulfonated aromatic hydrocarbons such as sodium α-naphthalene monosulfonate; condensation products of naphthalene sulfonic acids with formaldehyde; sodium octahydroanthracene sulfonate and alkylarylsulfonates having 1 or several alkyl groups of 8 or less carbon atoms.

The emulsions prepared by the method of this invention are characterized by extreme stability and extremely fine particle size. The dispersed particles of siloxane are so small that they cannot be resolved under an optical microscope. The stability of the emulsions is exemplified by the fact that they stand for years without separating and they can be centrifuged 2,000 r.p.m. for 30 minutes without any sign of separation and can be diluted to any concentration without separation. These emulsions can be rendered neutral by proper neutralization of the catalyst and if desired, the emulsion can be changed from a cationic to an anionic or nonionic system or vice versa after polymerization is complete or during polymerization. Thus, for example, if polymerization is to be carried out with an acid, it is best that a cationic or nonionic system be employed. However, it is sometimes desirable to employ anionic systems since better wetting of certain surfaces is thereby obtained. This change can be effected with the emulsions of this invention without any deleterious effects as to particle size and stability by merely adding an anionic dispersion agent to the system.

The emulsions of this invention may be employed for release agents or for coating compositions. The method of this invention is particularly adaptable for the preparation of latex paints. For example, the emulsion can be mixed with the desired pigment or other fillers and then applied to a surface where the water will evaporate leaving a continuous coating.

It should be understood that the utility of the method of this invention is not limited to the production of emulsions but may also be employed to facilitate production of siloxane polymers which can be recovered by breaking the emulsion. This is particularly true in the case of acid catalyzed polymers since the speed of reaction is greatly increased in the method of this invention over the speed obtained with heretofore known methods. This is particularly true with low temperature polymerization.

The viscosity of the siloxanes shown in the following examples refers to the viscosity of the siloxane, per se, and not to that of the emulsion. The viscosity was determined by separating the siloxane from the emulsion and determining its viscosity by usual methods.

The following examples are illustrative only and are not to be construed as limiting the invention which is properly delineated in the appended claims.

*Example 1*

8 g. of a mixture of 70% by weight of dioctadecyldimethyl ammonium chloride and 30% by weight of dihexadecyl dimethyl ammonium chloride (said mixture being hereinafter referred to as Arquad 2 HT), were dissolved with warming in 283 g. of octamethylcyclotetrasiloxane. The solution was then added with stirring to 243 g. of water. The resulting emulsion was made alkaline by the addition of aqueous ammonia. The emulsion was heated at 70° C. for 10½ hours whereupon the viscosity of the siloxane was 3,000 cs. The resulting emulsion was quite stable.

*Example 2*

Employing the method of Example 1, 30 g. of mixed cyclic ethylmethylsiloxanes having a viscosity of 5.3 cs., 1 g. of Arquad 2 HT, and 60 g. of water were emulsified and then mixed with 35 g. of 28% aqueous ammonia. The alkaline emulsion was allowed to stand at room temperature whereupon the viscosity of the siloxane gradually increased to 27 cs. The emulsion showed no sign of separation after one year.

*Example 3*

Employing the method of Example 1, an emulsion of 30.5% by weight of a mixture of 7.5 mol percent cyclic phenylmethylsiloxane and 92.5 mol percent cyclic dimethylsiloxane, 1% by weight of Arquad 2 HT, 59% by weight of water and 9.5% by weight of ammonia was prepared and was heated at 50° C. for 5 days. After 2 days the viscosity of the siloxane was 6,000 cs. and after 5 days the viscosity had risen to 22,600 cs. After 1 year the emulsion was centrifuged at 2,000 r.p.m. for 30 minutes. No separation occurred.

*Example 4*

Employing the method of Example 1, an emulsion was prepared from 30 g. of mixed cyclic phenylmethylsiloxanes, 7.5 g. of Arquad 2 HT, 70 g. of water and 5 g. of 28% ammonium hydroxide. The emulsion was allowed to stand at room temperature whereupon polymerization of the phenylmethylsiloxanes to a higher viscosity took place.

*Example 5*

2 g. of a mixture of about 70% by weight didodecyldimethyl ammonium chloride and about 30% by weight ditetradecyldimethyl ammonium chloride (said mixture being known as Arquad 2 C) was mixed with 30 g. of octamethylcyclotetrasiloxane and the solution was poured into 70 g. of 15% aqueous HCl. The mixture was emulsified by agitation and then heated at 50° C. whereupon the viscosity of the siloxane increased to 466 cs.

*Example 6*

A mixture of 10 g. of octamethylcyclotetrasiloxane and 1 g. of octadecyltrimethyl ammonium chloride was emulsified with 10 ml. of 36.5% hydrochloric acid and the emulsion was allowed to stand at room temperature whereupon the viscosity increased to 20,000 cs.

*Example 7*

A mixture of 150 g. of octamethylcyclotetrasiloxane and 7.5 g. of the trimethylnonylether of polyethylene glycol was emulsified with 60 g. of 36.5% hydrochloric acid and allowed to stand at 25° C. After 4 hours the viscosity of the siloxane was 5600 cs. The emulsion was diluted with water to give an acid concentration of 18% in the aqueous phase and 1.3 hours thereafter the viscosity of the siloxane was over 1,000,000 cs. The resulting emulsion was quite stable.

*Example 8*

142 g. of cyclic dimethylsiloxane, 6.9 g. of cyclic vinylmethylsiloxane and 7.8 g. of the trimethylnonylether polyethylene glycol were mixed and added with agitation to 150 g. of 36.5% hydrochloric acid. The emulsion so formed was allowed to stand at room temperature. After 5 hours the viscosity of the copolymer was 1420 cs. The acid concentration in the aqueous phase was then lowered to 30% by the addition of water and after 1 hour at room temperature the viscosity was over 1,000,000 cs.

*Example 9*

An emulsion was prepared in accordance with the method of Example 8 from 122.1 g. of cyclic dimethylsiloxane, 24 g. of cyclic methyl hydrogen siloxane, 8 g. of the trimethylnonyl ether of polyethylene glycol and 145 g. of 36.5% hydrochloric acid. After 24 hours' standing at room temperature the viscosity of the fluid was 358 cs. The acid concentration was then lowered to 32% in the aqueous phase and after 40 minutes the viscosity of the fluid had risen to 592 cs.

*Example 10*

A mixture of 50 g. of cyclic dimethylsiloxane and 2 parts of the trimethylnonyl ether of polyethylene glycol was emulsified with 50 parts of 62% sulfuric acid. The emulsion stood at room temperature and after one day the viscosity of the siloxane had reached 1162 cs.

*Example 11*

40 g. of a 55% toluene solution of a resinous siloxane having the composition 33 mol percent monophenylsiloxane, 32.5 mol percent monomethylsiloxane, 27 mol percent phenylmethylsiloxane and 7.5 mol percent diphenylsiloxane, was mixed with 2 g. of Arquad 2 HT. The mixture was then added with stirring to 60 g. of water. 5 g. of 28% aqueous ammonia was then added to the emulsion. After one day a substantial increase in the molecular weight of the resin had occurred.

*Example 12*

2 g. of a mixture of 70% by weight dioctadecyldimethyl ammonium hydroxide and 30% by weight dihexadecyldimethyl ammonium hydroxide was added to 60 g. of cyclic dimethylsiloxane. The mixture was poured into water and agitated to give an emulsion and the emulsion was heated at 50° C. The viscosity of the siloxane increased to 16,800 cs.

*Example 13*

A mixture of 74 g. of cyclic dimethylsiloxane, 1.5 g. of ammonium oleate was added in 75 g. of water. The mixture was agitated to give an emulsion and 2.2 g. of KOH were added. The emulsion was heated in a closed vessel at 125° C. whereupon the viscosity of the siloxane increased to 1,025 cs. Equivalent results were obtained when caesium hydroxide was employed as a catalyst.

*Example 14*

An emulsion containing 40% by weight cyclic dimethylsiloxane, 2% by weight sodium lauryl sulfate, 1% by weight Arquad 2 HT and 57% by weight water was prepared in the usual manner. The siloxane in the emulsion was polymerized by employing a small amount of tetramethyl ammonium hydroxide as a catalyst. Equivalent results were obtained when sodium hydroxide was employed as the catalyst.

*Example 15*

An emulsion was prepared in the usual manner from 1050 g. of cyclic dimethylsiloxane, 1579 g. of water and 50 g. of Arquad 2 HT. 432 g. of 28% aqueous ammonia was then added to the emulsion and the product was polymerized by heating at 50° C. until the viscosity reached 63,300 cs. The resulting emulsion was then agitated as 72.95 g. of sodium laurate sulfate in 250 g. of water were added. The ammonia was then removed from the emulsion by bubbling air therethrough whereupon a neutral anionic very stable emulsion resulted. This emulsion wets glass.

*Example 16*

A copolymeric siloxane is obtained when a mixture of 90 mol percent cyclic dimethylsiloxane and 10 mol percent

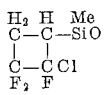

is emulsified and polymerized in accordance with the procedure of Example 8.

*Example 17*

Trimethyl end-blocked dimethylsiloxane fluids are obtained when a mixture of 99 mol percent cyclic dimethylsiloxane and 1 mol percent hexamethyldisiloxane is copolymerized in accordance with the procedure of Example 1.

That which is claimed is:

1. A method which comprises polymerizing and copolymerizing organosiloxanes of the formula

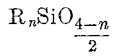

in which R is of the group consisting of monovalent hydrocarbon radicals, halogenated monovalent hydrocarbon radicals and hydrogen atoms and $n$ has an average value from 1 to less than 3, while said siloxane is emulsified in an aqueous medium by reacting said siloxane in said dispersed state with a catalyst of the group consisting of strong mineral acids and strong alkalis until the desired increase in molecular aggregation of the siloxane is obtained.

2. The method which comprises polymerizing and copolymerizing organosiloxanes of the formula

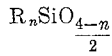

in which R is of the group consisting of monovalent hydrocarbon radicals, halogenated monovalent hydrocarbon radicals and hydrogen atoms and $n$ has an average value from 1 to less than 3, while said siloxane is emulsified in an aqueous medium by reacting the siloxane with hydrochloric acid until the desired increase in molecular aggregation is obtained.

3. A method of polymerizing and copolymerizing organosiloxanes of the formula

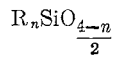

in which R is of the group consisting of monovalent hydrocarbon radicals and halogenated monovalent hydrocarbon radicals and $n$ has an average value from 1 to less than 3, which comprises emulsifying said siloxane in water in the presence of an emulsifying agent of the formula $R_4NX$ in which R is an alkyl radical, at least one of said R's having at least 12 carbon atoms and X is an acid anion, rendering the emulsion alkaline by the addition of an alkaline material and allowing the polymerization to proceed until the desired state of molecular aggregation is obtained.

4. A method of preparing an emulsion of an organopolysiloxane which comprises polymerizing and copolymerizing organosiloxanes of the formula

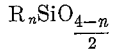

in which R is of the group consisting of monovalent hydrocarbon radicals, halogenated monovalent hydrocarbon radicals and hydrogen atoms and $n$ has an average value from 1 to less than 3, by reacting said siloxane while in a finely dispersed state in an aqueous medium with a catalyst of the group consisting of strong mineral acids and strong alkalis until the desired increase in molecular aggregation of the siloxane is obtained and thereafter rendering the emulsion neutral.

5. A method which comprises polymerizing and copolymerizing organosiloxanes of the formula

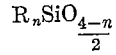

in which R is of the group consisting of monovalent hydrocarbon radicals and halogenated monovalent hydrocarbon radicals and $n$ has an average value from 1 to less than 3, while said siloxane is emulsified in an aqueous medium, by reacting said siloxane in said dispersed state with a quaternary ammonium hydroxide of the formula $R_4NOH$ in which R is an alkyl radical and at least one of the R's has at least 12 carbon atoms until the desired increase in molecular aggregation of the siloxane is obtained.

References Cited in the file of this patent

UNITED STATES PATENTS

| | | |
|---|---|---|
| 2,571,533 | Britton et al. | Oct. 16, 1951 |
| 2,666,685 | Hommel et al. | Jan. 19, 1954 |
| 2,803,613 | Kather et al. | Aug. 20, 1957 |
| 2,803,614 | Solomon | Aug. 20, 1957 |

UNITED STATES PATENT OFFICE

CERTIFICATE OF CORRECTION

Patent No. 2,891,920                                                                      June 23, 1959

James F. Hyde et al.

It is hereby certified that error appears in the printed specification of the above numbered patent requiring correction and that the said Letters Patent should read as corrected below.

Column 3, lines 34 and 35, for "diodecylidiethyl" read -- didodecyldiethyl --; column 6, line 64, for "50 g." read -- 60 g. --.

Signed and sealed this 17th day of November 1959.

(SEAL)
Attest:

KARL H. AXLINE
Attesting Officer

ROBERT C. WATSON
                                                       Commissioner of Patents